United States Patent
Sakiyama

(10) Patent No.: US 8,425,328 B2
(45) Date of Patent: Apr. 23, 2013

(54) TERMINAL DEVICE, CONTROL METHOD FOR TERMINAL DEVICE, INFORMATION NON-TRANSITORY STORAGE MEDIUM AND PROGRAM

(75) Inventor: Takahiro Sakiyama, Tokyo (JP)

(73) Assignee: Konami Digital Entertainment Co., Ltd., Minato-ku, Tokyo (JP)

(*) Notice: Subject to any disclaimer, the term of this patent is extended or adjusted under 35 U.S.C. 154(b) by 90 days.

(21) Appl. No.: 13/259,090

(22) PCT Filed: Mar. 23, 2010

(86) PCT No.: PCT/JP2010/054949
§ 371 (c)(1),
(2), (4) Date: Sep. 22, 2011

(87) PCT Pub. No.: WO2010/110251
PCT Pub. Date: Sep. 30, 2010

(65) Prior Publication Data
US 2012/0015728 A1 Jan. 19, 2012

(30) Foreign Application Priority Data
Mar. 26, 2009 (JP) ................................. 2009-076337

(51) Int. Cl.
*A63F 9/24* (2006.01)
(52) U.S. Cl.
USPC .................... 463/42; 463/31; 463/40; 463/43

(58) Field of Classification Search ..................... 463/31, 463/39–43
See application file for complete search history.

(56) References Cited

FOREIGN PATENT DOCUMENTS

| JP | 2003-006127 | 1/2003 |
|---|---|---|
| JP | 3669587 B1 | 7/2005 |
| JP | 2005-261856 | 9/2005 |
| JP | 4150410 B2 | 9/2008 |

OTHER PUBLICATIONS

Written Opinion dated Jun. 8, 2010.

*Primary Examiner* — Omkar Deodhar
(74) *Attorney, Agent, or Firm* — Howard & Howard Attorneys PLLC

(57) ABSTRACT

A progress-degree storage section (202) stores the degree of progress of a game. An input receiving section (203) receives the input of instruction operations. A game progressing section (204) causes the game to progress according to the instruction operations. A progress-degree update section (205) updates the degree of the progress in such a manner that the degree of the progress advances with the elapse of time from when the reception of input of an instruction operation is ended until the reception of input of the next instruction operation is started, and the difference between the degrees of progress stored in all terminal devices (201) becomes small and stops the update of the degree of the progress between the start and end of the reception of the input of the instruction operation. An image display section (206) displays an image of the game associated with the degree of the progress stored.

8 Claims, 4 Drawing Sheets

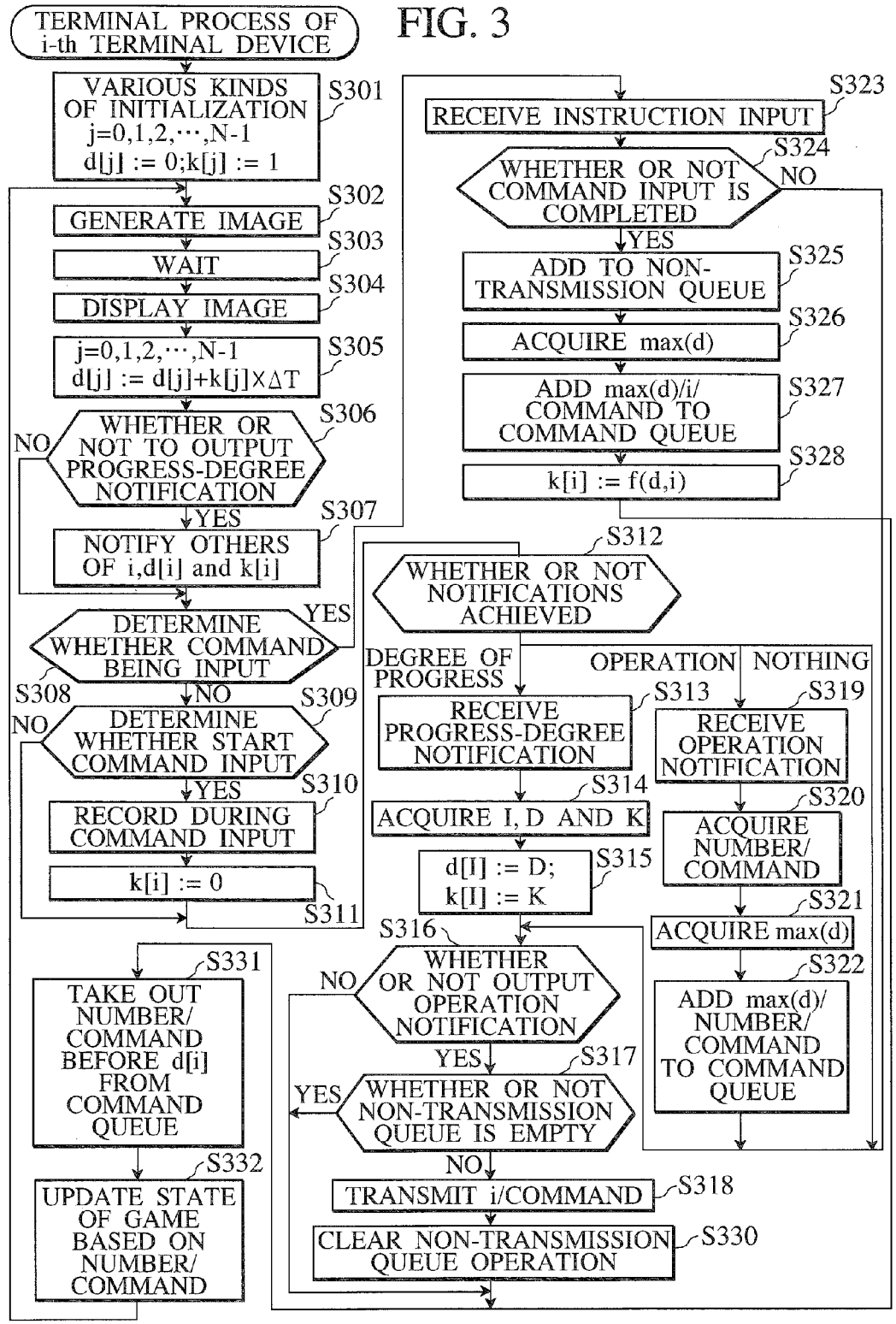

TERMINAL DEVICE, CONTROL METHOD FOR TERMINAL DEVICE, INFORMATION NON-TRANSITORY STORAGE MEDIUM AND PROGRAM

TECHNICAL FIELD

The present disclosure relates to terminal device, control method for terminal device, information non-transitory storage medium and a program capable of appropriately indicating the progress of a game to all the players even if some time is required for the input of an instruction operation in a game system in which a plurality of terminal devices forming a group share in the progress of the game.

BACKGROUND ART

In the past, a system was proposed whereby a plurality of players play a game using terminal devices with a network communication function. The terminal devices may be computers, game devices, and/or the like.

In a MMORPG (Massively Multiplayer Online Role Playing Game), and/or the like, many players cooperate and progress through the game. During gameplay, a game may be configured so that each player can asynchronously input a command. When the player inputs the command, the game device displays a suitable screen and the player performs the required operation. For example, a menu screen is displayed, and a player moves a cursor onto a desired item and pushes a selection button. Therefore, some time may be required for the input of the command.

On the other hand, in the below-mentioned Patent Document 1 discloses a game system in which a player interrupting a game can preferably play after resumption of the game, while the order of the players complies as much as possible with a predetermined rule. An undelayed player waits until a resumed player reaches the same stage in the game system.
Patent Document 1: Japanese Patent Publication No. 4,150,410.

DISCLOSURE OF INVENTION

Problem to be Solved by the Invention

A player will not be able to understand the progress of the game, when the command input requires time and the game is progressing during the command input.

On the other hand, stopping the progress of the game for all the players while a certain player is inputting a command becomes an obstacle to the progress of the game.

The objective of the present disclosure is to provide a terminal device, a control method for the terminal device, information non-transitory storage medium and program, capable of appropriately indicating the progress of the game to all players in the game system in which a plurality of terminal devices forming a group share in the progress of the game, even when inputting the instruction operation requires a certain amount of time, which may solve the above-described issues.

In order to achieve the abovementioned objective, the following invention is disclosed according to the principles of the present disclosure.

A terminal device according a first aspect of the present disclosure is one of a plurality of terminal devices in a game system in which the plurality of terminal devices forming a group share in the progress of a game. The terminal device comprises a progress-degree storer, an input receiver, a game progresser, a progress-degree updater and an image displayer, and which is configured as follows.

In other words, the progress-degree storer stores a degree of progress of the game.

The degree of progress of the game is typically information that corresponds, to the time in the game world in the game system. A certain amount of time is required for the player to input the command by the player. In the present disclosure, time stops during the input of the command in the game world with respect to the player. Therefore, the time in the game world in each of the terminal devices may not be the same when some player inputs a command. In other words, a difference may occur in the degree of progress in each of the terminal devices. Accordingly, a process is performed to decrease the difference in game world time in each of the terminal devices. The degree of progress in each of the terminal devices is stored in the progress-degree storer. All the terminal devices share in the progress of the game using the stored degree of progress.

On the other hand, the input receiver receives the input of instruction operations from a player.

The input of the instruction operations is a series of operations from the player. For example, the player determines when display a menu on a screen by moving a cursor onto a desired item. The time which is required to input the command depends on the skill level of the user. However, a certain amount of time is generally required in order to input one command.

Furthermore, the game progresser progresses the game in which the progress is shared, according to received instruction operations.

First, the terminal device receives the command corresponding to the instruction operation from the player. The terminal device shares the received command with other terminal devices in the group. All the terminal devices in the group progress the game together and realize the communication game.

Moreover, the progress-degree updater updates the degree of progress stored in the progress-degree storer, wherein:

(a) the degree of progress continues over a time period from a finishing of the reception of input of a certain instruction operation among the instruction operations to a start of the reception of input of the next instruction operation, and the degree of progress updated to reduce a difference in the degree of progress stored in each of the plurality of terminal devices belonging to the group becomes small; and (b) stops the updating of the degree of progress over a time period from the start of the reception of input of the instruction operation to the finish of the reception for each of the instruction operations.

The term "progressed with time" means to make progress over a certain period.

The progress-degree updater updates the degree of progress of the game, in other words the time in the game world. Generally, the time in the game world and the time in the real world are connected. Specifically, both times correspond to each other. For example, when one hour of real time progresses, one hour of game time also progresses.

However, if the time in the game world progresses while the player is inputting the instruction operation, there is a possibility that the player will not be able to understand the progress of the game. The present disclosure, the time in the game world does not progress while the player is inputting the instruction operation.

The time in the game world of each of the terminal devices may not be the same when this configuration is used. In the present embodiment, the relation between the time in the real world and the time in the game world is adjusted so as to reduce the difference in the degree of progress when the degree of progress of the game in each of the terminal devices is not the same. Typically, the degree of progress of the terminal device which runs behind is updated faster than that of the other terminal device. Moreover, the degree of progress in the delayed terminal device may be updated even more slowly than the other terminal devices.

Furthermore, the image displayer displays a game image corresponding to the degree of progress stored.

As described above, when the degrees of progress of the game in each of the terminal devices is not the same, the game image corresponding to the degree of progress in each terminal device is displayed on the screen. In an aspect which that shows an existing scene of the game world on the screen, the degree of progress is not updated while the player is inputting the instruction operation. Therefore, during the input of the instruction operation, the game screen is displayed in a state where time has stopped.

According to the present disclosure, even if a game system where a plurality of terminal devices forming the group sharing in the progress of the game required a certain amount of time for the input of the instruction operation, the progress of the game would be appropriately indicated to all players.

Moreover, progress-degree updater in the terminal device of the present disclosure continues to make the degree of progress over the time period in which the degree of progress is updated, at a predetermined corresponding rate that corresponds to a difference in the highest degree of progress among the degrees of progress stored in each of the plurality of terminal devices belonging to the group and the degree of progress stored in the progress-degree storer.

Typically, when the difference is less than a threshold value, the degree of progress is considered within an error range. Therefore, the time in the game world progresses at a rate same as the rate of time in the real world. Moreover, in a case where the difference exceeds the threshold value, the time in the game world progresses at a faster rate than the time in the real world. In particular, in the latter case, the rate may increase as the difference becomes larger.

According to the present disclosure, appropriately adjusting the rate of progress of the game enables the degree of progress of the game presented to the player by each terminal device to be as much the same as possible.

Moreover, the terminal device of the present disclosure further comprises an operation notifier, an operation receiver, a progress-degree notifier and a progress-degree receiver and, can be configured as follows.

The operation notifier, when receiving the instruction operation, notifies the other terminal devices, among the plurality of terminal devices belonging to the group of the instruction operation. Moreover, the operation receiver receives an instruction operation issued from the other terminal devices among the plurality of terminal devices belonging to the group.

These processes allow for the instruction operations made in each terminal device in the group to be shared by all the terminal devices.

Furthermore, the progress-degree notifier periodically notifies the other terminal devices among the plurality of terminal devices belonging to the group of the degree of progress stored in the progress-degree storer. Moreover, the progress-degree receiver receives the degree of progress issued from the other terminal devices among the plurality of terminal devices belonging to the group.

These processes allow for the degrees of progress made in each terminal device in the group to be shared by all the terminal devices.

Then, the game progresser, when receiving the instruction operation, determines a timing at which the instruction operation is performed in a progress of the game, based on the largest degree of progress and stored degree of progress and the highest degree of progress stored when receiving the instruction operation.

Each terminal device knows the instruction operations that have been executed in all the terminal devices, and the degrees of progress. Therefore, each terminal device sets the time when the instruction operation has been executed to the most advanced time point. The time being referred to is the game world time.

According to the present disclosure, even if the degree of progress of the game in each of the terminal devices is not the same, the time (in the game world) is synchronized at the time the instruction operations are executed, to thereby prevent the occurrence of any inconsistencies in the game.

In the progress-degree updater of the terminal device of the present disclosure, a rate of the progress of the game where the degree of progress stored in the progress-degree storer is larger than an average value or a median value of the degree of progress received and the degree of progress stored may be slower than a rate of the progress of the game where the degree of progress stored in the progress-degree storer is smaller than the average value or a median value of the degree of progress received and the degree of progress stored. Specifically, the rate of the progress of the game where the degree of progress stored in the progress-degree storer is larger than the average value or the median value of the received degree of progress and the stored degree of progress may be slower than time passage in real world, and the rate of the progress of the game in a case where the degree of progress stored in the progress-degree storer is smaller than the average value or the median value of the received degree of progress and the stored degree of progress may be faster than the time passage in the real world.

In these aspects of the present disclosure, the rate of updating the degree of progress is faster in the terminal device with a small degree of progress in the game than in the terminal device with large degree of progress, or faster than in actual time. On the other hand, the rate of updating the degree of progress is slower in the terminal device with a large degree of progress of the game than in the terminal device with small degree of progress, or slower than in actual time.

According to the present disclosure, appropriately adjusting the rate of the game appropriately enables the degrees of progress of the game presented to the player by each of the terminal devices to be as much the same as possible.

A control method for a terminal device according to another aspect of the present disclosure including: the terminal device comprising a progress-degree storer storing a degree of progress of the game, an input receiver, a game progresser, a progress-degree updater and an image displayer, for controlling one of a plurality of terminal devices in a game system in which the plurality of terminal devices forming a group share in the progress of a game, the control method for the terminal device comprising: an input receiving process, a game progressing process, a progress-degree update process and an image display process, and which is configured as follows.

In the input receiving process, the input receiver receives inputs of instruction operations from a player.

On the other hand, in the game progressing process, the game progresser progresses the game, in which the progress is shared, according to an instruction operations received.

Furthermore, in the progress-degree update process, the progress-degree updater updates the degree of progress stored in the progress-degree storer, wherein:

(a) the degree of progress continues over a time period from a finish of the reception of input of a certain instruction operation among the instruction operations to the start of the reception of the input the next instruction operation, and the degree of progress is updated to reduce a the difference in the degree of progress stored in each of the plurality of terminal devices belonging to the group; and (b) stops the updating of the degree of progress over a time period from the start of the reception of the input of the instruction operation to the finish of the reception for each of the instruction operations.

On the other hand, in the image display process, the image displayer displays a game image corresponding to the degree of progress stored.

A computer readable information non-transitory storage medium of another aspect of the present disclosure stores a program which causes a computer to function as a progress-degree storer, an input receiver, a game progresser, a progress-degree updater and an image displayer.

The progress-degree storer stores a degree of progress of the game.

The input receiver receives inputs of instruction operations by a player.

The game progresser progresses the game in which the progress is shared, according to an instruction operation received.

The progress-degree updater updates the degree of progress stored in the progress-degree storer, wherein the progress-degree updater:

(a) the degree of progress continues over a time period from a finish of the reception of input of a certain instruction operation among the instruction operations to the start of the reception of the next input of following instruction operation, and the degree of progress is updated to reduce a difference in the degree of progress stored in each of the plurality of terminal devices belonging to the group becomes small; and (b) stops the updating of the degree of progress over a time period from the start of the reception of input of the instruction operation to the finish of the reception for each of the instruction operations.

The image displayer displays a game image corresponding to the degree of progress stored.

According to the present disclosure, a computer to function as the terminal device operating in above-described configuration.

A program of another aspect of the present disclosure may cause a computer to function as a progress-degree storer, an input receiver, a game progresser, a progress-degree updater and an image displayer.

The progress-degree storer stores a degree of progress of the game.

The input receiver receives inputs of instruction operations from a player.

The game progresser progresses the game in which the progress is shared, according to an instruction operation received.

The progress-degree updater updates the degree of progress stored in the progress-degree storer, wherein the progress-degree updater:

(a) the degree of progress continues over a time period from the finish of the reception of input of a certain instruction operation among the instruction operations to the start of the reception of input of the next instruction operation, and the degree of progress is updated to reduce a difference between degree of progress stored in each of the plurality of terminal devices belonging to the group; and (b) stops the updating of the degree of progress over the time period from the start of the reception of input of the instruction operation to the finishing the reception for each of the instruction operations.

The image displayer displays a game image corresponding to the degree of progress stored.

According to the present disclosure, it is possible to cause a computer to function as the terminal device operating in above-descried manner.

Moreover, the program of the present disclosure can be recorded on the computer readable information non-transitory storage medium such as a compact disk, a flexible disk, a hard disk, a magneto-optical disk, a digital video disk, a magnetic tape and, a semiconductor memory.

The above-mentioned program can be distributed and sold through a computer communication network, independently from the computer by which the program is executed. Moreover, the abovementioned information non-transitory storage medium can be distributed and sold independently from the computer.

According to the present disclosure, a terminal device, a control method for the terminal device, an information non-transitory storage medium and a program may be provided, which is capable of appropriately indicating the progress of the game to all players in the game system in which a plurality of terminal devices forming a group share in the progress of the game, even if the input of the instruction operation requires a certain amount of time.

BRIEF DESCRIPTION OF DRAWINGS

FIG. 3 is a flowchart showing a flow of a control of the terminal process according to the present embodiment;

BEST MODE FOR CARRYING OUT THE INVENTION

The embodiments of the present disclosure will be described below. Hereinafter, the embodiments will be described using an information processing device for games, so as to easily understand a configuration achieved. The below-described embodiments described are merely provided as examples, and the present disclosure is not restricted to these embodiments.

Accordingly, the scope of the present disclosure includes an embodiment in which each of these elements or all the elements may be modified by one of ordinary skill in art so as to be substituted by (an) equivalent element(s).

First Embodiment

Figure 1:
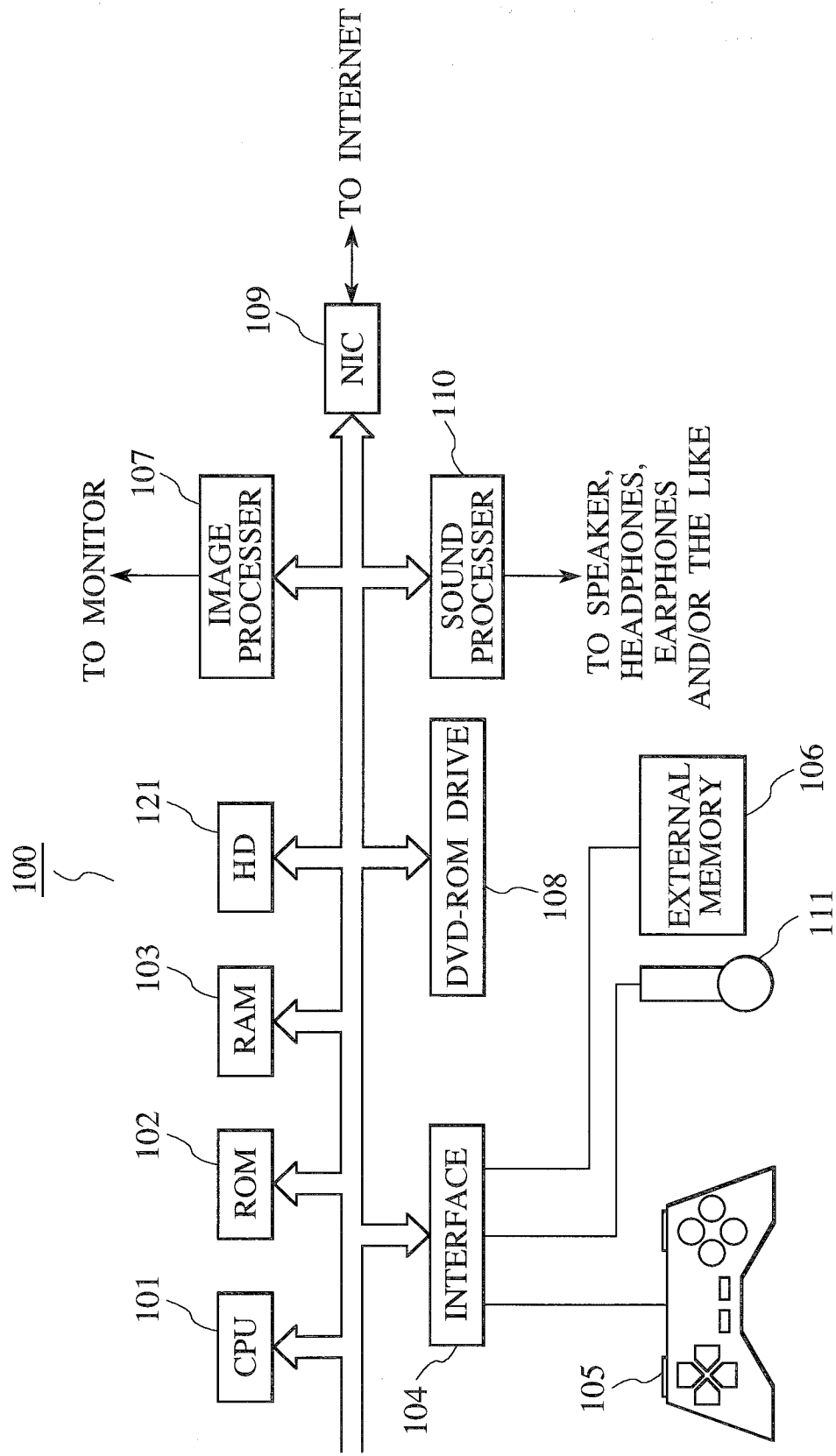
FIG. 1 is a schematic diagram showing a general configuration of a typical information processing device.

FIG. 1 is a schematic diagram showing a schematic configuration of a typical information processing device that can function as a terminal device of the present embodiment by executing a program.

The information processing device 100 shown in the figure corresponds to so-called consumer game device. The information processing device 100 includes a CPU (Central Processing Unit) 101, a ROM (Read Only Memory) 102, a RAM (Random Access Memory) 103, an interface 104, a controller 105, an external memory 106, an image processer 107, a DVD-ROM (Digital Versatile Disc ROM) drive 108, a NIC (Network Interface Card) 109, a sound processer 110, a microphone 111 and a hard disk (HD) 121. Any of type of input/output devices may be arbitrary omitted.

In a case of where the information processing device 100 to function as a typical consumer game device, a player fits a DVD-ROM recording data and the program for the game into the DVD-ROM drive 108 and turns on the power. Afterwards, the game program is executed, and the player can play the game.

Moreover, the application may be installed by storing the DVD-ROM in the DVD-ROM drive 108 onto the HD 121. Executing the program stored in the HD 121 causes variety applications, including the game to execute.

The terminal device of the present disclosure and variety of server apparatus are only different in the scale and the kind of information processing that is being executed. The terminal device and the server apparatus are each is achieved by a configuration which is essentially same as the information processing device 100 shown in the figure.

In order to make, the game device to be portable, a slot for a ROM cassette may be used instead of the DVD-ROM drive 108. A ROM (Read Only Memory) cassette and an EEPROM (Electrically Erasable Programmable ROM) cassette are fitted into the slot for the ROM cassette. If the program for application has been written in the ROM cassette or the EEPROM cassette, the program may be executed. In the present case, the HD 121 can be omitted. Moreover, a connector may be used instead of the slot for ROM cassette. A cartridge having the ROM and the RAM is connected to the connector. In the present case, the program for the application is saved in the RAM in the cartridge. The data to be stored during game play is stored in the RAM in the cartridge. In addition, the program for the application can be installed in the external memory 106.

The CPU 101 controls all the operations of the information processing device 100. The CPU 101 is connected to each of components, and, transmits and receives control signals and data via the components. Moreover, the CPU 101 can perform various calculations using an ALU (Arithmetic Logic Unit; not shown) to a register (not shown). The register is a high-speed access memory region. The calculations are an arithmetic operations such as addition, subtraction, multiplication and division; a logical operation such as logical OR, logical AND and logical NOT; and a bit operation such as bitwise OR, bitwise AND, bit inversion, bit shift, bit rotation, and bit operation. Furthermore, the CPU 101 may be configured so as to perform a saturate calculation such as addition, subtraction, multiplication and division for multimedia processing, trigonometric functions, vector operation, and/or the like, at high-rate. The CPU 101 may include a coprocessor for achieving such high-rate operation.

An IPL (Initial Program Loader) is recorded on the ROM 102. The IPL is executed right after turning on the power. The execution of the IPL causes the program recorded on the DVD-ROM to be loaded on the RAM 103. The CPU 101 starts the execution of the program. A program of an operating system and various kinds of data are recorded on the ROM 102. The operating system is required for operation control of the entire information processing device 100.

Data and programs are temporarily stored on the RAM 103. The RAM 103 stores programs and data loaded from the HD 121, the DVD-ROM, and/or the like. The RAM 103 also stores data which is required for the progress of an on-line game or a chat communication. The CPU 101 provides a variable number region on the RAM 103. The CPU 101 performs processes such as calculations and writing calculation results on the RAM 103. The CPU 101, for example, performs the calculations by directly applying the ALU to values stored as the variable number in the RAM 103. Or, the CPU 101 may temporally store the values, which is stored in the RAM 103, into the register. The CPU 101 may then perform the calculations to the register.

The controller 105 connected through the interface 104 receives an operation input which is operated by a user at the time of game execution.

The controller 105 is not always required to fit to the information processing device 100 in external manner. The controller 105 may be integrated with the information processing device 100. The controller 105 of a portable terminal device is configured with various buttons and switches. The terminal device treats a press operation on the buttons and switches as the operation input. In addition, with regard to a information processing device 100 that contains a touch screen, a trace that is made when a user traces the touch screen with a finger or a pen is treated as the operation input. Moreover, a keyboard, a mouse, and/or the like, may be connected to the information processing device 100 instead of the controller 105. The keyboard receives edit input of a character string from the user. The mouse receives various designations regarding a position and selection input from the user.

The external memory 106 connected through the interface 104 stores the data showing play statuses (a past score, and/or the like) of the game, and/or the like, the data showing a state of progress of the game, and the data of the log (record) of a chat communication in network match-playing, and/or the like. The external memory 106 is removable and rewritable. When the user performs an instruction input through the controller 105, the data may be arbitrarily recorded on the external memory 106.

As described above, the application program can be executed by being installed in the external memory 106. This is preferred when the capacity of the external memory 106 is large.

The DVD-ROM is installed into the DVD-ROM drive 108. A program for executing the game, image data and sound data associated with the game is recorded on the DVD-ROM. The DVD-ROM drive 108 reads required program and data from the installed DVD-ROM via the control of the CPU 101. The read program and data are temporarily stored in the RAM 103, and/or the like.

The image processer 107 carries out a processing of the data read from the DVD-ROM by the CPU 101 or a GPU (Graphics Processing Unit; not shown). The image processer 107 may comprise a VPU (Visual Processing Unit) which performs all image processing. Subsequently, the image processer 107 records the read data on a frame memory (not shown). The frame memory is provided with the image processer 107. Furthermore, a monitor (not shown) is connected to the image processer 107. The image information recorded on the frame memory is converted into video signals at a predetermined synchronized time, and is output to the monitor. Then, various image displays are possible.

Typically, a small-sized liquid crystal display is used as the monitor of the portable terminal device. In a case where a touch screen is used as the controller 105, the display panel of the touch screen functions as the monitor. As the terminal device for playing games at a home, or the monitor of a server apparatus, a display device such as a CRT (Cathode Ray Tube) or a plasma display may be used.

The GPU can perform a superposition calculation of two-dimensional images, a penetration calculation such as alpha blending, and various saturate calculations at high rate.

Moreover, the GPU can also perform a calculation for obtaining a rendering image at high rate. The rendering image is obtained by performing a rendering of polygon information by a z-buffer algorithm. Moreover, various kinds of texture information have been added to the polygon information. In the rendering image, the polygon arranged in the virtual three-dimensional space is an overview in a predetermined direction of sight from a predetermined viewpoint.

Furthermore, the CPU 101 and the GPU can cooperate and draw a character string as a two-dimensional image. Specifically, the CPU 101 and the GPU can acquire font information which defines the shape of characters, and can draw a character string to the frame memory or on each polygon surface.

The NIC 109 is used for connecting the information processing device 100 to a computer communication network (not shown) such as the Internet. The NIC 109 is an interface (not shown) which intervenes between various kinds of Internet access devices and the CPU 101. The Internet access devices may comply with 10BASE-T/100BASE-T standards, which are used in a case of configuring LAN, an analog modem for accessing the Internet using a telephone line, an ISDN (Integrated Services Digital Network) modem, an ADSL (Asymmetric Digital Subscriber Line) modem, and a cable modem for accessing the Internet using a cable television line, and/or the like.

In addition, an Internet access device that is compatible with a wireless LAN may be employed as the NIC 109. In this case, typically, when accessing the Internet, the NIC 109 performs an infrastructure communication. Moreover, in a case where information processing devices 100 arranged in the vicinity communicate with each other, the NIC 109 performs an ad hoc communication.

Moreover, it is also possible to download the application program from the computer communication network through the NIC 109, and to install the application program in the HD 121, and/or the like.

A speaker (not shown) is connected to the sound processor 110. The sound processor 110 converts the sound data read from the HD 121 or the DVD-ROM into analog audio signals. Then, the sound processor 110 outputs sound from the speaker based on the audio signals. Moreover, the sound processor 110 generates sound effect and music data, which are to be used during the progress of the game being controlled by the CPU 101. Subsequently, the sound processor 110 outputs the generated sound from the speaker and headphones (not shown) and earphones (not shown).

When the sound data recorded on the HD 121 or the DVD-ROM is MIDI data, the sound processor 110 converts the sound data into PCM data with reference to a MIDI sound source. The sound processer 110 has the MIDI sound source. When the sound data is compressed sound data such as that in an ADPCM form or in Ogg Vorbis form, the sound processer 110 decompresses the sound data, and converts the sound into the PCM data. The sound processer 110 applies D/A (Digital/Analog) conversion of the PCM data at the timing based on the sampling frequency thereof. The sound processer 110 can output sound by outputting the analog signals to the speaker.

Furthermore, the microphone 111 may be connected to the information processing device 100 through the interface 104. In the present case, the analog signals from the microphone 111 are applied the A/D conversion by an appropriate sampling frequency. The converted audio signals are digital signals of the PCM form. The process of mixing, and/or the like, into a digital signal may be performed by the sound processor 110.

Typically, the information processing device 100 in the present embodiment utilizes the large-capacity external storage device such as the HD 121 described above. The HD 121 is able to achieve the same function as the ROM 102, the RAM 103, the external memory 106 and the DVD-ROM equipped to the DVD-ROM drive 108.

A general-purpose personal computer, a computer for servers, and/or the like, can also be utilized instead of the information processing device 100 of the present embodiment.

The above-described information processing device 100 corresponds to a game device for consumers. However, an electronic device in which various input-and-output processes are available may achieve various game devices similar to the terminal device of the present disclosure. Therefore, various kinds of game devices can be achieved on various computers, such as a cellular phone, a handheld game device, a karaoke device, and an ordinary business computer.

For example, the business computer can achieve the game device. A CPU, a RAM and a ROM, a DVD-ROM drive, a NIC and a HD, which are components of the business computer, also function as the above-mentioned information processing device 100 as well. Moreover, the business computer has an image processer with a simpler function than the information processing device 100. Furthermore, a flexible disk, a magneto optical disk, a magnetic tape, and/or the like, in the business computer may be utilized as the external storage. Typically, a keyboard, a mouse, and/or the like, are utilized as an input device for the business computers, rather than the controller 105.

The plurality of terminal devices involved the present embodiment form a group, and share in the progress of the game. A method for forming a group and sharing in the progress of the game has been broadly divided into the following three configurations.

(a) A configuration in which each of the terminal devices is managed by a common server apparatus. The present configuration is suitable for cases where the terminal devices perform a communication game by the infrastructure mode of the wireless LAN, and/or the like.

(b) A configuration in which any of the terminal devices is serves as a master, the other of the terminal devices are serve as slaves, and the master manages the slave. In present configuration, the master plays the role of the server. The present configuration is suitable when the terminal devices perform the communication game via the ad hoc mode of the wireless LAN, and/or the like.

(c) A configuration in which each of the terminal devices manages the progress of the game based on an equality relationship.

Only the terminal devices or the server apparatus processing the functions of each part differ among these three configurations, while the gist of the processes among these three configurations is shared.

Hereinafter, an aspect of the above-mentioned configuration (c) will be described as an example. However, the present method may be modified into various configurations of the abovementioned configuration (a) and the abovementioned configuration (b) by sending and receiving information arbitrarily between each terminal device and the server apparatus.

Figure 2:
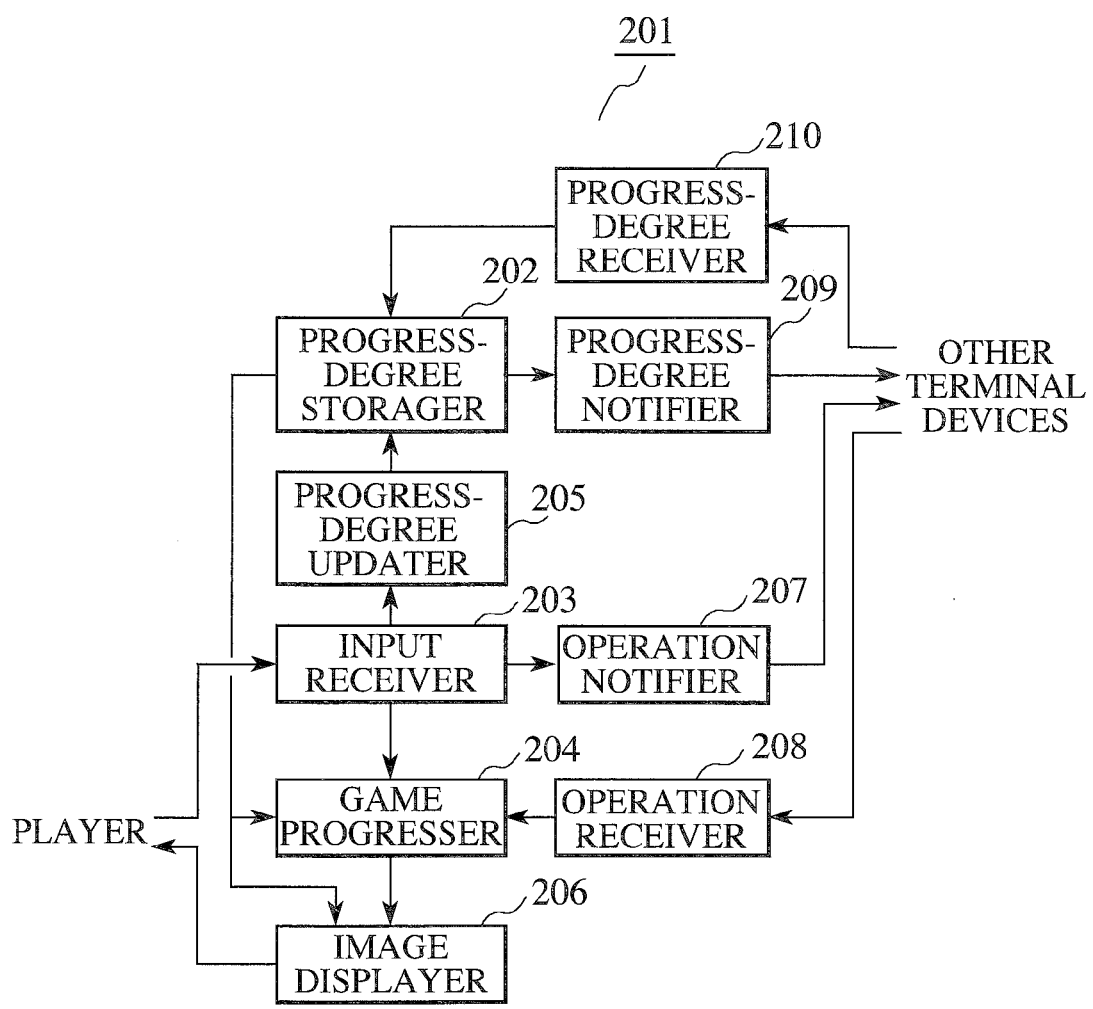
FIG. 2 is a block diagram showing a general configuration of the terminal device according to the present embodiment.

FIG. 2 is an explanatory diagram showing schematic configuration of the terminal device according to the present embodiment. Hereafter, the present embodiment will be explained with reference to the figure.

The terminal device 201 according to the present embodiment is achieved by installing a recording medium such as the DVD-ROM into the abovementioned information processing device 100 and executing the program recorded on the recording medium.

The terminal device 201 has a progress-degree storer 202, an input receiver 203, a game progresser 204, a progress-degree updater 205, an image displayer 206, an operation notifier 207, an operation receiver 208, a progress-degree notifier 209, and a progress-degree receiver 210.

The progress-degree storer 202 stores the degree of progress of the game. The progress-degree storer 202 is achieved by the RAM 103 in the present embodiment.

In the present embodiment, the time in a game world in a game system is utilized as the degree of progress of the game. In the present embodiment, while the player is performing the input operation, the time game world in the terminal device 201 used by the player is stopped. Therefore, the time in the game world in other terminal devices 201 and the time in the game world in the terminal device 201 may not be the same when an input operation is being performed by the player. The time in the game world is stored in the progress-degree storer 202 as information of the degree of progress of the game. The time in the game world is presented to the player.

In the present embodiment, the ratio between the rate of the time in the game world and the rate of the time in the real world is also stored in the progress-degree storer 202 as information of the degree of progress of the game.

On the other hand, the input receiver 203 receives the input of the instruction operations from the player. In the present embodiment, the input receiver 203 is controlled by the controller 105.

When the instruction operation is input in the present embodiment, a menu is displayed on a screen, and the player selects a desired item by, for example, moving a cursor onto the item. The input of the instruction operation in the present embodiment is achieved by such a series of instruction operations. The time which is required to input a command depends on the skill of a user. However, generally, a certain amount of time is required in order to input one command.

Furthermore, the game progresser 204 progresses the game in the terminal device 201 according to the instruction operation received. Each of the terminal devices 201 shares the in progress of the game. In the present embodiment, the game progresser 204 is achieved by operating the CPU 101 and each section of the information processing device 100 together.

In other words, when the command corresponding to the instruction operation of the player is received by the terminal device 201, the terminal device 201 transmits and receives the instruction operation using the operation notifier 207 and the operation receiver 208. The abovementioned transmission and reception allows for the instruction operation to be shared between the other terminal devices 201. The terminal device 201 and other terminal devices 201 progress the game together, to thereby achieve the communication game. The operation notifier 207 and the operation receiver 208 are achieved by operating the CPU 101 and the NIC 109, and/or the like together.

Furthermore, the progress-degree updater 205 updates the degree of progress stored in the progress-degree storer 202, wherein, (a) the degree of progress continues over time a period from the finish of the reception of input of a certain instruction operation among the instruction operations to the start of the reception of input of the next instruction operation, and the degree of progress is updated to reduce a difference in the degree of progress stored in each of a plurality of terminal devices 201 belonging to the group; and (b) stopping the updating of the degree of progress over the period from the start of the reception of input of the instruction operation to finish of the reception for each of the instruction operations. The progress-degree updater 205 is achieved by the CPU 101.

The progress-degree updater 205 updates the degree of progress of the game. In other words, the progress-degree updater 205 updates the time in the game world.

As described above, in the present embodiment, the time in the game world and the time in the real world are connected in principle. More specifically, both of times correspond to each other. For example, for every one of game time that passes, one hour of real time passes.

However, in the present embodiment, the time in the game world does not progress while the player is inputting the instruction operation. The progress of the game in the other terminal devices 201 during the operation input is reproduced after the operation input is finished. Therefore, the player can easily understand the progress of the game during the operation input.

When using the present configuration the time in the game world of each of the terminal devices 201 may not be the same. In the present embodiment, when the degree of progress of the game in each of the terminal devices 201 is not the same, the relationship between time in the real world and time in the game world is adjusted to reduce a difference in the degree of progress. When making an adjustment, a rate of the game in the delayed terminal device 201 is speed up, and a rate of the game of the accelerated terminal device 201 is slowed down as described below.

Consequently, the terminal devices 201 belonging to the same group share information by periodically transmitting and receiving information on the degree of progress in the game, using the progress-degree notifier 209 and the progress-degree receiver 210. According to this process, each of the terminal devices 201 may learn whether the degree of progress of the game presented to the player of the delayed or accelerated terminal device 201 runs in comparison with the degree of progress of the game presented to the player of the other terminal devices 201. The progress-degree notifier 209 and the progress-degree receiver 210 are achieved by working the CPU 101 and the NIC 109 together.

In the present embodiment, when the instruction operation has been received, the game progresser 204 determines the time when the instruction operation is executed in the game world, based on the highest degree of progress among the degree of progress received and the degree of progress stored.

Each of the terminal devices 201 knows the instruction operation which were executed in all the terminal devices 201 and the degree of progress therein. Therefore, the time when an instruction operation was executed in the game world is set to the time where the highest degree of progress was made in the game world, to thereby prevent the occurrence of any inconsistencies in the history of the game world.

Furthermore, the image displayer 206 displays a game image corresponding to the degree of progress stored. The image displayer 206 is implemented by the image processer 107.

As described above, in a case where the degree of progress of the game in each terminal device 201 is not the same, the game image corresponding to the degree of progress of the terminal device 201 is displayed on the screen. In an embodiment displaying an existing screen of a game world situation, the degree of progress is not updated during the input of the instruction operation. Therefore, the game image is displayed with the time stopped.

Hereinafter, the details of a terminal process performed in each terminal device 201 will be explained. FIG. 3 is a flowchart showing the flow of a control of the terminal process according to the present embodiment. Hereinafter, the present embodiment will be explained with reference to this figure. Moreover, the present figure will explained under the presumption that an i-th terminal device 201 among a plurality of terminal devices 201.

When this process is started, the CPU 101 of the information processing device 100, which implements the terminal device 201, performs various initializations (step S301). During the present initialization, for example, the following processes are performed.

First, the CPU performs a search of other terminal devices 201 that share in the progress of the game, and a search of a communication setup via the NIC 109. When executing a communication game that utilizes the infrastructure communication of the wireless LAN, or wired LAN, the terminal device 201 connects to a lobby server, and/or the like, and is introduced to the other terminal device 201. When executing the communication game using a wireless LAN ad hoc communication, the terminal device 201 emits a beacon that establishes a communication with a nearby terminal device 201.

Once the other terminal device 201 has been determined, and a group is formed for the game progression, a number is assigned for the terminal device 201 in the group. When the group consists of N terminal devices 201, any of integers of 0, 1, 2, ..., N−1 is assigned as the number of each terminal device 201 in the present embodiment. The numbers are different from each other.

In addition, various initial settings are performed for the game. During initial settings, clear operations for two queues: a non-notification queue and a command queue are also performed.

The command is a queue that stores:

(a) a command corresponding to the instruction operation inputted by the player of each terminal device 201;

(b) the number of the terminal devices 201; and (c) "time in the game world", which is considered a time that the command is input.

The items (a) to (c) are stored as a set of information items. On the other hand, the non-notification queue stores the command corresponding to the instruction operation input by the player of the terminal device 201.

Moreover, information on whether or not a command is currently being input is also initialized.

In addition, the CPU 101 initializes the progress-degree storer 202 stored in the RAM 103, and proceeds to a step S302. In the present embodiment, "elapsed time in the game world", is utilized as the degree of progress of the game from a time point where the game started.

Hereafter, in order to make an understanding easy, the degree of progress in an i-th terminal device 201 is written as d[i], and the rate of the game of the terminal device 201 is written as k[i]. The storage area for $$d[0], d[1], d[2], \ldots, d[N-1], \text{ and}$$

$$k[0], k[1], k[2], \ldots, k[N-1]$$

are prepared in the progress-degree storer 202 of each terminal device 201.

At the time of initialization, d[0], d[1], d[2], ..., d[N−1] are initialized to be 0.0 respectively and, k[0], k[1], k[2], ..., k[N−1] are initialized to be 1.0 respectively. In other words, for each of integers j=0, 1, 2, ..., N−1, $$d[j]:=0.0; k[j]:=1.0$$

are executed. The term ":=" means substitution or assignment. Moreover, the present disclosure uses a real number as a value. However, the degree of progress and rate may also be expressed by an integer calculation using fixed-point expression.

Subsequently, when the number of the terminal device 201 is i-th, the CPU 101 generates an image showing (a) in the game world based on the degree of progress d[i] stored in the progress-degree storer 202, and (b) various information to be shown to the user in RAM 103 (step S302).

More specifically, "the time in the game world" in the i-th terminal device 201 is d[i].

Moreover, while various commands are being input, and/or the like, a menu heading, cursor, various kinds of parametric information, and/or the like, are included in the generated picture as information presented to the user.

Once the picture has been generated, the CPU 101 waits until vertical synchronization interruption occurs (step S303). Once the vertical synchronization interruption has occurred, the CPU 101 controls the image-processing part 107 to display the generated image on a monitoring screen (step S304). Moreover, during the wait in the step S303, various processes may be executed as coroutines.

In addition, the CPU 101 performs $$d[j]:=d[j]+k[j]\times \Delta T$$

for the respective integers j=0, 1, 2, ..., N−1 (step S305). The term, ΔT is a cycle of the vertical synchronization interruption, and typically, is about 1/30 seconds, or 1/60 seconds.

Subsequently, the CPU 101 checks the timing that a progress-degree notification should or should not be performed by the terminal device 201 (step S306). When performing a time division communication, the time that the progress-degree notification should be performed at is a time when the present time is included in the slot for communication assigned to the terminal device 201. The communication slot may be separately assigned for a command notification, and other communication slots for a degree of notification.

In addition, the method is simply as follows. Specifically, the CPU 101 counts the number of times c of the vertical synchronization interruptions from the start of the game to the present game time. Next, the CPU 101 checks whether or not the remainder, obtained by dividing the number of times concerned by a constant value M that is equal to or more than N, equals the number i-th of the terminal device 201. In other words, the CPU 101 checks whether or not $$c \bmod M = i$$

is true. When c mod M=i is true, the CPU 101 determines that the degree of progress should be notified. Typically, M is equal to or more than twice the value of N.

When the degree of progress should be notified at the present time point (step S306; Yes), the terminal device 201 notifies the other terminal devices 201 of the individual number i, the present degree of progress d[i], and the present rate k[i] (step S307), and then proceeds to a step S308.

When the degree of progress should not be notified at the present time point (step S306; No), the CPU 101 directly proceeds to the step S308.

Furthermore, the CPU 101 checks whether or not the command is just being input by the player at the present time (step S308). If the command is not being input (step S308; No), the CPU 101 confirms whether or not the command input is started by verifying the status of the operation input using the controller 105 (step S309). For example, when a menu display button prepared on the controller 105 is pressed, the CPU 101 determines that the command input is started. When the command input is not started (step S309; No), the CPU 101 proceeds to a step S312.

On the other hand, in a case where the start of the command input is detected (step S309; Yes), the CPU 101 records that the command is being input at the present time on RAM 103 (step S310), and updates the present rate k[i] recorded on the RAM 103 to be $$k[i]:=0$$

(step S311).

Updating in this way allows for the time d[i] in the game world that is shown by the i-th terminal device 201 not to change, even when the update is performed in the step S305.

Furthermore, the CPU 101 monitors the NIC 109 to check whether or not various notifications have reached from other terminal devices 201 (step S312). When no notifications arrive (step S312; nothing), the CPU 101 proceeds to a step S316.

The progress-degree notification is transmitted in the step S307 by the other terminal devices 201.

Afterwards, the progress-degree notification is detected in the step S312. In other words, when the progress-degree notification has arrived (step S312; the degree of progress), the terminal device 201 receives the progress-degree notification (step S313), and obtains the number I, the degree D of progress, and the rate K, which are designated by the progress-degree notification (step S314). Next, the CPU 101 updates d[I] and k[I] recorded on the RAM 103, as follows (step S315).

$$d[I]:=D; k[I]:=K$$

Next, the CPU 101 proceeds to a step S316.

When K=0.0, the current command is being input into the I-th terminal device 201. Moreover, d[I] shows the degree of progress of a game scene shown to the current player by the I-th terminal device 201.

Furthermore, the CPU 101 checks whether or not the terminal device 201 should provide the operation notification at the present time (step S316). With regard whether or not the terminal device 201 should provide the operation notification at the present time, the CPU 101 may determine whether or not the present time is included in the communication slot therefor, similar to the above-mentioned progress-degree notification. Moreover, the CPU 101 may determine the above based on whether or not $$c \bmod M = N+i$$

is true.

When providing the operation notification (step S316; Yes), the CPU 101 checks whether or not the non-notification queue is empty (step S317).

When the non-notification queue is not empty (step S317; No), the operation notifier 207 transmits the operation notification designating the number i of the terminal device 201 and the command stored in the non-notification queue to the other terminal devices 201 (step S318). In addition, the CPU 101 clears the non-notification queue (step S330). The CPU 101 then proceeds to a step S331.

The command stored in the non-notification queue is typically up to one item. However, a plurality of commands may be stored depending on the timing of the operation notification.

On the other hand, when the operation notification should not be performed at the present time (step S316; No), or the non-notification queue is empty (step S317; Yes), the CPU 101 proceeds directly to a step S331.

An example will be described where the operation notification is transmitted in the above manner from the other terminal devices 201. When the operation notification reaches the terminal device 201, the NIC 109 in the step S312 detects the arrival of the operation notification (step S312; operation). Subsequently, the terminal device 201 receives the operation notification (step S319), and obtains the number and the command designated by the operation notification (step S320).

In addition, the CPU 101 obtains the maximum value max (d)=max(d[0], d[1], d[2], . . . , d[N−1]) in the degrees of the progress d[0], d[1], d[2], . . . , d[N−1] of each terminal device 201 (step S321). Subsequently, the CPU 101 adds information showing (a) an obtained command; (b) an obtained number of the terminal device 201; and (c) a max (d) to the command queue (step S322). The obtained command is considered to be the input at the time of max (d) in the game world in the terminal device 201 of the obtained number. The CPU 101 then proceeds to the step S316.

The max (d) means the maximum degree of progress among those of all terminal devices 201. According to the above-described process, no discrepancies occur in the order of the commands, and/or the like, in each of the terminal devices, when determining the time that the command is input.

When the command is being input at the present time (step S308; Yes), the input receiver 203 checks the status of the operation input by the controller 105, and receives the instruction input (step S323). The command is input by the instruction input. The instruction input may be a pressure operation of a cursor key or a selection button; a moving operation or a clicking operation of a mouse; a touching operation on a touch panel via a touch pen; and/or the like.

The abovementioned operation input allows the player to select a desired command from the menu headings in the menu displayed on the screen, and allows the parameters of various games to be displayed on the screen.

In addition, the CPU 101 checks whether or not the input of one command is completed (step S324), based on the instruction input received. For example, when the player selects the desired command from the menu heading and moves the cursor key onto the tree-like menu and presses the selection button, the command input is completed.

When the command input has not been completed, and the command input is required for the player to continue the operation instructions (step S324; No), the CPU 101 proceeds to the step S316.

When the command input has been completed (step S324; Yes), the CPU 101 adds the command to the non-notification queue (step S325), and obtains max (d) (step S326). Afterwards, information showing (a) the input command; (b) the number i of the terminal device 201; and (c) the max (d) is added to the command queue (step S327). The input command is considered to be the input at the time of max (d) in the game world in the i-th terminal device 201.

Therefore, the command added to the non-notification queue in the step S325 is transmitted in the step S318. Moreover, the commands transmitted from the other terminal devices 201 are received in the step S319, and are also registered in the command queue in the step S322.

On the other hand, a command is added to the command queue of the i-th terminal device 201 in the step S327. This management allows for each terminal device to be able to 201 share in the command input so as to prevent discrepancies in the "time in the game world" inputted by a command in each of the terminal devices 201.

When the command input has been completed, the progress of the game is restarted in the i-th terminal device 201. In other words, the numerical value which is not 0.0 is given as the rate k[i].

Since the "time in the game world" is stopped during the command input in the i-th terminal device 201, the degree of progress d[i] of the game is less than the degree of progress d[i] in the other terminal devices 201. More specifically, $$\max(d) > d[i]$$

is true.

Under the following conditions, the easiest method of having the degree of progress d[i] of the i-th terminal device 201 equal the degree of progress of the other terminal devices 201 is to assign a value greater than one to the rate k[i].

The function f(d, i) is defined based on the parameters of an array d consisting of N elements, and index i of elements of the array. The rate k[i] of the i-th terminal device 201 is set to a return value of this function f (d, i).

The simplest definition of the function f(d, i) is shown below. Moreover, Ccon is a constant value larger than 1.0 and ε is a constant value representing a minute error, where $$\text{if } \max(d) - d[i] \leq \epsilon, \text{ then } f(d, i) = 1.0 \quad \text{(a)}$$

$$\text{if not, then } f(d, i) = C\text{con} \quad \text{(b)}$$

Typically, when considering a delay in time in the communication the constant value ε is about several times to ten times of ΔT taking the delay time. Another definition of the function f (d, i) will be described hereinafter.

As described above, when the input of the command in the step S324 is completed and the command is added to the command queue in the step S327, the CPU 101 updates the rate k[i] of the i-th terminal device 201 as follows (step S328).

$$k[i] := f(d, i)$$

The CPU 101 then proceeds to a step S331.

The progress-degree notifier 209 notifies the other terminal devices 201 that the rate k[i] has been updated in this manner when subsequently transmitting the progress-degree notification from the i-th terminal device 201.

Afterwards, the CPU 101 sequentially checks the information registered in the command queue, and extracts all information items from the command that were input before the degree of progress d[i] of current i-th present terminal device 201. In other words, the type of the command and the number of the terminal device 201 are extracted from the command queue (step S331).

Then, the CPU 101 updates the state of the game based on the number of the terminal devices 201 and the inputted command in order of the degree of progress regarding the information on the extracted command (step S332).

By updating the state of the game in this manner, the same command will be input by the same player at the same time in the game world, even though the situation in the game world presented at same time in the real world in each of the terminal devices 201 is not the same. Therefore, all the terminal devices 201 can share the progress of the game.

The CPU 101 returns to the step S302, after updating the state of the game in the step S332.

In the abovementioned embodiment, the reception of various notifications and the process of receiving the operation input are performed in one loop. However, these processes may also be performed in parallel by utilizing a reception interruption, a controller input interruption, and/or the like.

Moreover, the progress-degree notification is not necessarily required in order to periodically transmit. Generally, in the communication game, the terminal device 201 checks whether or not mutual connection has been established. Therefore, in the case of such a periodical check the terminal device 201 typically notifies the other terminal devices 201 of the information on the degree of progress via the master.

Figure 4A:
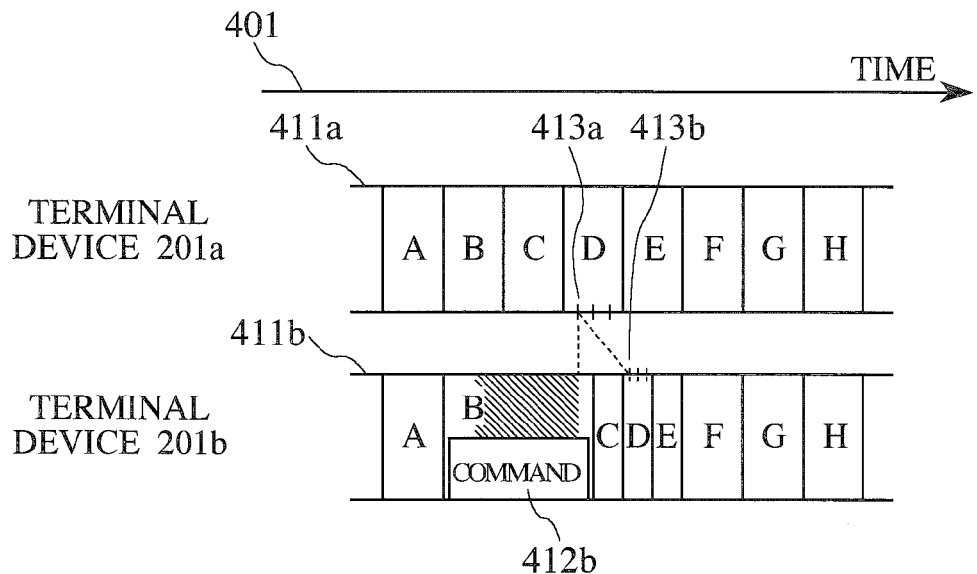
FIG. 4A is an explanatory diagram showing a time series in which scenes of progress of a game are shown on each terminal device in the present embodiment.
Figure 4B:
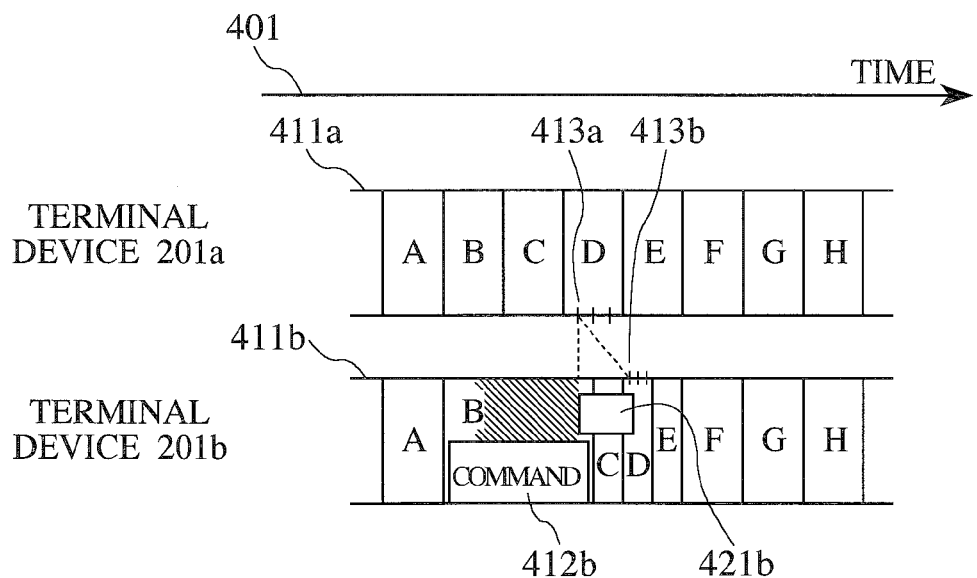
FIG. 4B is an explanatory diagram showing a chronological series (in a case of displaying a particular effect corresponding to a command) of progressive scenes of the game provided in each terminal device according to the present embodiment.

FIGS. 4A and 4B are explanatory diagrams showing an example of the progress of the game, and show two terminal devices 201 playing the communication game according to the present embodiment. Hereinafter, the present embodiment will be explained with reference to these figures.

The time-axis 401, which is a horizontal axis of these figures, refers to a direction along which time flows. The scenes of the game displayed on the terminal device 201a and the terminal device 201b are shown along the time lines 411a and 411b respectively as A, B, C, D, and/or the like.

At the beginning, the same scene, A, is presented simultaneously on the two terminal devices 201a and 201b.

When the scene B is displayed on the screen in the terminal devices 201a and 201b, the input 412b (shaded area in the figures) of the command is started in the terminal device 201b.

During the input 412b of the command, in the terminal device 201a, the game progresses as the scenes sequentially change to B, C and D in order. However, the scene displayed on the screen does not change in the terminal device 201b. Accordingly, the scenes displayed on the screens of the terminal devices 201a and the terminal device 201b are not the same.

When the input 412b of the command has been completed in the terminal device 201b, the terminal device 201b displays the scene by Ccon times rate (in these figures, Ccon=2) so that the degree of progress of the terminal device 201b may reach the degree of progress of the terminal device 201a. For this reason, the terminal device 201b reproduces the remaining part of the scene B, and the scenes C, D and E at high rate.

Moreover, at the start time of the scene F, the degree of progress of the terminal device 201b reaches the degree of progress of the terminal device 201a. Accordingly, the rate of the game of the terminal device 201b returns to the usual rate.

Moreover, the command in the command input 412b becomes effective at the time 413a which is the time in the game world of the terminal device 201a. In other words, the command in the command input 412b becomes effective at a time in the middle of the scene D. The reason the command becomes effective at this time is because the time in the game of the terminal device 201a is the most up to date.

More specifically, even when the input 412b of the command has been completed in the terminal device 201b, the input command does not become immediately effective. The progress of the game is reproduced at a high rate in the terminal device 201b. The command becomes effective at the time when the time in the game world in the terminal device 201b becomes the same as the time in the game world in the terminal device 201a.

Thus, the time in the real world, at which the command becomes effective in the terminal device 201a, is different from that in the terminal device 201b. However, the time in the game world where the command becomes effective in the terminal device 201a and the terminal device 201b is the same. Therefore, during the progress of the game there are inconsistencies between the terminal devices 201a and 201b.

FIG. 4A shows that little time is required from a time where the command input is completed to a time where the command input actually becomes effective. However, FIG. 4B shows that a special effects image corresponding to the command is displayed on the screen of the terminal device 201b at the time 421b from the time where the command input is completed to the time where the command input actually becomes effective. Typically, the special effects image is overlaid on the display which is fast forwarded in the game world.

The user who has performed the command input via this display is able to know whether the command input has been received. According to the present disclosure, in the game system in which a plurality of terminal devices 201 forming a group share in the progress of the game, even when the input of the instruction operation requires a certain amount of time, the progress of the game is appropriately presented to all players.

Various modifications of the function f (d, i) will be explained below.

In above-mentioned embodiment, the game rate k[i] is defined as follows. Ccon is a constant value larger than 1.0 and $\epsilon$ is a constant value representing a minute error, where $$\text{if } \max(d) - d[i] \leq \epsilon, \text{ then } f(d, i) = 1.0 \tag{a}$$

$$\text{if not, then } f(d, i) = \text{Ccon} \tag{b}$$

In the embodiment, the situation in the game world is displayed on the screen at Ccon times rate in the delayed terminal device 201. When the degree of progress of the delayed terminal device 201 reaches the degree of progress of the fastest terminal device 201, the game rate of the delayed terminal device 201 is returned to a single rate, which is the normal rate.

In addition, having the game rate of the delayed terminal device 201 gradually approach a single rate as the difference between the degree of progress of the delayed terminal device 201 and the degree of progress of the fastest terminal device 201 decreases is preferable. In the present case, the game rate k[i] may be defined as follows. Casy is an appropriate positive constant value.

$$\text{if } \max(d) - d[i] \leq \epsilon, \text{ then } f(d, i) = 1.0 \tag{a}$$

$$\text{if not, then } f(d, i) = 1 + \text{Casy} \times (\max(d) - d[i]) \tag{b}$$

Generally, the game rate k[i] is defined below, using the appropriate function g(.), which monotonically increases and returns a positive value, where $$\text{if } \max(d) - d[i] \leq \epsilon, \text{ then } f(d, i) = 1.0 \tag{a}$$

$$\text{if not, then } f(d, i) = 1 + g(\max(d) - d[i]) \tag{b}$$

Furthermore, a method is possible, in which reproduction of the accelerated terminal device 201 is by slow motion, and reproduction of the delayed terminal device 201 is by fast-forwarding, to thereby reduce a gap of progress in the game.

For example, when an average value of d[0], d[1], d[2], . . . , d[N-1] or a median value is set to Caom, the game rate k[i] may be defined as follows.

$$\text{if } d[i] \leq \text{Caom} - \epsilon, \text{ then } f(d, i) > 1 \tag{a}$$

$$\text{if } \text{Caom} - \epsilon < d[i] < \text{Caom} + \epsilon, \text{ then } f(d, i) = 1 \tag{b}$$

$$\text{if } \text{Caom} + \epsilon \leq d[i], \text{ then } f(d, i) < 1 \tag{c}$$

The values of f(d, i) in the two different cases (a) and (c) may be used as a constant value exceeding 1 or a constant value less than 1. a result may utilized that is obtained by applying the difference between Caom and d[i] to a function that is monotonically varied and that corresponds to the abovementioned function g(.).

Accordingly, the game rate in each terminal device 201 is slowed down or sped up, in order for the degree of progress of each terminal device 201 to be as much the same as possible.

The present application claims the priority of Japanese Patent Application No. 2009-076337, the entire disclosure of which is incorporated by reference herein.

Industrial Applicability

As described above, according to the present disclosure, a terminal device, a control method for the terminal device, an information non-transitory storage medium and a program may be provided, which are capable of appropriately indicating the progress of the game to all players in the game system in which a plurality of terminal devices forming a group share in the progress of the game, even if the input of the instruction operation takes a certain amount of time.

Explanation of References 100 information processing device
101 CPU
102 ROM
103 RAM
104 interface
105 controller
106 external memory
107 image processor
108 DVD-ROM drive
109 NIC
110 sound processor
111 microphone
121 HD
201 terminal device
202 progress-degree storer
203 input receiver
204 game progresser
205 progress-degree updater
206 image displayer
207 operation notifier
208 operation receiver
209 progress-degree notifier
210 progress-degree receiver
401 time axis
411 time line showing indicated scenes
412 time period at which a command is input
413 time point at which an inputted command is interpreted
421 time period at which a particular effect is indicated

The invention claimed is:

1. A terminal device (201) which is one a plurality of terminal devices (201) in a game system in which a plurality of terminal devices (201) forming a group share in the progress of a game, the terminal device comprising:
   a progress-degree storer (202) storing a degree of progress of the game;
   an input receiver (203) receiving input of an instruction operation from a player;
   a game progresser (204) progressing the game in which the progress is shared based on the instruction operation received;
   a progress-degree updater (205) updating the degree of progress stored in the progress-degree storer (202), wherein
   (a) the degree of progress continues over a time period from a finish of the reception of input of a certain instruction operation among the instruction operations to a start of the reception of input of the next instruction operation, and the degree of progress is updated to reduce a difference in the degree of progress stored in each of the plurality of terminal devices (201) belonging to the group; and (b) stopping the updating of the degree of progress over a time period from the start of the reception of input of the instruction operation to the finish of the reception for each of the instruction operations; and an image displayer (206) displaying a game image corresponding to the degree of progress stored.

2. The terminal device (201) according to claim 1 wherein, the progress-degree updater (205) continues to make the degree of progress over the time period in which the degree of progress is updated, at a predetermined rate that corresponds to a difference in the highest degree of progress among the degrees of progress stored in each of the plurality of terminal devices (201) belonging to the group and the degree of progress stored in the progress-degree storer (202).

3. The terminal device (201) according to claim 2 further comprising:

an operation notifier (207) that notifies other terminal devices (201) among the plurality of terminal devices (201) belonging to the group of the instruction operation when receiving the instruction operation;

an operation receiver (208) receiving an instruction operation issued from the other terminal devices (201) among the plurality of terminal devices (201) belonging to the group;

a progress-degree notifier (209) periodically notifying the other terminal devices (201) among the plurality of terminal devices (201) belonging to the group of the degree of progress stored in the progress-degree storer (202); and a progress-degree receiver (210) receiving the degree of progress issued from the other terminal devices (201) among the plurality of terminal devices (201) belonging to the group, wherein the game progresser (204), when receiving the instruction operation, determines a timing at which the instruction operation is performed in a progress of the game, based on the largest degree of progress among received degree of progress and stored degree of progress.

4. The terminal device (201) according to claim 3 wherein, a rate of progress of the game where the degree of progress stored in the progress-degree storer (202) in the progress-degree updater (205) is larger than an average value or a median value of the degree of progress received and the degree of progress stored is slower than a rate of progress of the game where the degree of progress stored in the progress-degree storer (202) in the progress-degree updater (205) is smaller than an average value or a median value of the degree of progress received and the degree of progress stored.

5. The terminal device (201) according to claim 4 wherein, the rate of progress of the game where the degree of progress stored in the progress-degree storer (202) is larger than the average value or the median value of the received degree of progress and the stored degree of progress is slower than time passage in real world; and the rate of the progress of the game where the degree of progress stored in the progress-degree storer (202) is smaller than the average value or the median value of the received degree of progress and the stored degree of progress is faster than the time passage in the real world.

6. A control method for a terminal device (201) including: a progress-degree storer (202) storing a degree of progress of the game, an input receiver (203), a game progresser (204), a progress-degree updater (205) and an image displayer (206), for controlling one of a plurality of terminal devices (201) in a game system in which the plurality of terminal devices (201) forming a group share in the progress of a game, the terminal device (201), the control method for the terminal device (201) comprising:

an input receiving process for receiving input of an instruction operation from a player by an input receiver (203);

a game progressing process for progressing a game, in which the progress is shared, based on the instruction operation received by a game progresser (204);

a progress-degree update process for having a progress-degree updater (205) update the degree of progress stored in the progress-degree storer (202), wherein (a) the degree of progress continues over a time period from a finish of the reception of input of a certain instruction operation among the instruction operations to a start of the reception of the input of the next instruction operation, and the degree of progress is updated to reduce a difference in the degree of progress stored in each of the plurality of terminal devices (201) belonging to the group; and (b) stops the updating of the degree of progress over a time period from the start the of the reception of input of the instruction operation to the finish of the reception for each of the instruction operations; and an image display process in which an image displayer (206) displays a game image corresponding to the degree of progress stored.

7. A computer readable information non-transitory storage medium storing a program causing a computer to function as one of a plurality of terminal devices (201) in a game system in which the plurality of terminal devices (201) forming a group share in the progress of a game, the program causing the computer to function as:

a progress-degree storer (202) storing a degree of progress of the game;

an input receiver (203) receiving input an instruction operation from a player;

a game progresser (204) progressing the game in which the progress is shared based on the instruction operation received;

a progress-degree updater (205) updating the degree of progress stored in the progress-degree storer (202), wherein (a) the degree of progress continues over a time period from a finish of the reception of input of a certain instruction operation among the instruction operations to a start of the reception of input of the next instruction operation, and the degree of progress is updated to reduce a difference in the degree of progress stored in each of the plurality of terminal devices (201) belonging to the group; and (b) stopping the updating of the degree of progress over a time period from the start of the reception of input of the instruction operation to the finish of the reception for each of the instruction operations; and an image displayer (206) displaying a game image corresponding to the degree of progress stored.

8. A program causing a computer to function as one of a plurality of terminal devices (201) in a game system in which the plurality of terminal devices (201) forming a group share in the progress of a game, the program causing the computer to function as:
- a progress-degree storer (202) storing a degree of progress of the game;
- an input receiver (203) receiving input of an instruction operation from a player;
- a game progresser (204) progressing the game in which the progress is shared based on the instruction operation received;
- a progress-degree updater (205) updating the degree of progress stored in the progress-degree storer (202), wherein
- (a) the degree of progress continues over a time period from a finish of the reception of input of a certain instruction operation among the instruction operations to a start of the reception of input of the next instruction operation, and the degree of progress is updated to reduce a difference in the degree of progress stored in each of the plurality of terminal devices (201) belonging to the group; and
- (b) stopping the updating of the degree of progress over a time period from the start of the reception of input of the instruction operation to the finish the reception for each of the instruction operations; and
- an image displayer (206) displaying a game image corresponding to the degree of progress stored.

* * * * *